United States Patent
Buckley (10) Patent No.: US 7,706,779 B2
(45) Date of Patent: Apr. 27, 2010

(54) SYSTEM AND METHOD FOR CONTROLLING VCC FUNCTIONALITY IN A NETWORK ENVIRONMENT INCLUDING IMS

(75) Inventor: Adrian Buckley, Tracy, CA (US)

(73) Assignee: Research In Motion Limited, Waterloo (CA)

( * ) Notice: Subject to any disclaimer, the term of this patent is extended or adjusted under 35 U.S.C. 154(b) by 986 days.

(21) Appl. No.: 11/376,897

(22) Filed: Mar. 16, 2006

(65) Prior Publication Data

US 2007/0217354 A1 Sep. 20, 2007

(51) Int. Cl.
*H04M 1/725* (2006.01)

(52) U.S. Cl. .................. 455/412.1; 455/414.2; 455/417; 455/422.1; 455/436; 455/466; 370/352; 370/401; 370/410

(58) Field of Classification Search .................. 370/329, 370/331, 352–353, 355–356, 401, 410; 455/412.1, 455/417, 422.1, 435–436, 445, 466; 709/230
See application file for complete search history.

(56) References Cited

U.S. PATENT DOCUMENTS

| | | | |
|---|---|---|---|
| 2007/0014281 A1* | 1/2007 | Kant | 370/352 |
| 2007/0213037 A1* | 9/2007 | Lukacs | 455/414.1 |
| 2007/0223450 A1* | 9/2007 | Holmstrom et al. | 370/352 |

FOREIGN PATENT DOCUMENTS

| | | | |
|---|---|---|---|
| GB | 2 434 058 A | 7/2007 | |
| WO | 2007/081146 A1 | 7/2007 | |
| WO | 2007/091794 A1 | 8/2007 | |

OTHER PUBLICATIONS

European Search Report; European Patent Office; Jun. 23, 2006; 5 pages.
"Universal Mobile Telecommunications System (UMTS); Service Aspects; Service Principles"; Technical Specification; Dec. 2005; pp. 1-46.
"Digital Cellular Telecommunications System (Phase 2+); Universal Mobile Telecommunications System (UMTS); Organization of Subscriber Data"; Technical Specification; Dec. 2005; pp. 1-73.
"3rd Generation Partenship Project; Technical Specification Group Services and System Aspects; Voice Call Continuity Between CS and IMS Study"; Technical Report; Dec. 2005; pp. 1-153.
English Translation of U.S. Appl. No. 60/765,213, filed Feb. 6, 2006; 23 pages.

* cited by examiner

*Primary Examiner*—Dwayne Bost
*Assistant Examiner*—Inder P Mehra
(74) *Attorney, Agent, or Firm*—The Danamraj Law Group, P.C.

(57) ABSTRACT

In one embodiment, a scheme is disclosed for controlling voice call continuity (VCC) functionality of a user equipment (UE) device with respect to a call in a network environment including a visited network and an IP multimedia subsystem (IMS) network. The UE device's VCC operational mode is provided to be selectably alterable responsive to user input. Upon detecting the VCC operational mode of the UE device, a message is generated by the UE device towards the network environment including a VCC application server node disposed in the IMS network, the message being generated pursuant to a call originated by the UE device while roaming in the visited network, wherein the message includes a VCC operational mode indicator indicative of the UE device's VCC operational mode.

24 Claims, 7 Drawing Sheets

SYSTEM AND METHOD FOR CONTROLLING VCC FUNCTIONALITY IN A NETWORK ENVIRONMENT INCLUDING IMS

FIELD OF THE DISCLOSURE

The present patent disclosure generally relates to call routing in communications networks. More particularly, and not by way of any limitation, the present patent disclosure is directed to a system and method for controlling voice call continuity (VCC) functionality in a network environment including a circuit-switched (CS) network and an IP multimedia subsystem (IMS) network, wherein a wireless user equipment (UE) device is operable to originate a call while roaming in a visited network.

BACKGROUND

Mobile voice-over-IP (VoIP) handover is the process of continuing a voice call as a user moves between IP-based networks (e.g., wireless LAN (WLAN) or Wi-MAX networks, etc.) and circuit-switched cellular networks. To effectuate such handover, current $3^{rd}$ Generation Partnership Project (3GPP) standards specify that when a dual mode wireless UE device originates a call requiring inter-domain continuity, the call be routed to a call continuity control function (CCCF) element that is disposed in a new, IP-based network architecture referred to as the IP multimedia subsystem (IMS). In a typical IMS implementation, accordingly, all mobile-originated calls, including those made from a visited network, are routed to the subscriber's home network comprising appropriate IMS infrastructure in order to effectuate suitable access and remote call control legs. While this routing process is generally appropriate if call continuity is desired, there may be situations where such routing can result in inefficient use of radio signaling resources of the network environment. For instance, if the home network determines that the visited network does not support the necessary mechanisms for effectuating inter-domain transfer, then routing the calls made from the visited network need not be routed to the home IMS infrastructure. Also, if the UE device itself is not capable of inter-domain VoIP handover, routing any calls originated by such a device via the home IMS infrastructure would be futile regardless of the capabilities of the visited network. In another scenario, a network operator may decide to disable the domain transfer capability where the UE device is currently registered, for example, due to network load, etc. On the other hand, a subscriber may likewise wish to disable the domain transfer capability, for example, to preserve battery resources.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a scheme for controlling VCC functionality of a wireless UE device with respect to a call in a network environment including a visited network and an IMS network. The UE device's VCC capability and associated operational mode is provided to be selectably alterable responsive to user input. Additionally or alternatively, the VCC mode may be modulated based on a number of factors such as, e.g., whether the visited network supports interoperability with appropriate IP-based access networks that facilitate a VCC service, or due to an indication that the quality of service is unacceptable for some reason, and the like. Upon detecting the VCC operational mode of the UE device, a message is generated by the UE device towards the network environment including a VCC application server node disposed in the IMS network, the message being generated pursuant to a call originated by the UE device while roaming in the visited network, wherein the message includes a VCC operational mode indicator indicative of the UE device's VCC operational mode. In one exemplary implementation, the VCC operational mode indicator comprises one or more bits of an information element included in the message.

In one aspect, a method is disclosed for controlling VCC functionality of a UE device with respect to a call in a network environment including a visited network and a home IMS network, comprising: detecting a VCC operational mode associated with the UE device; and generating a message by the UE device towards the network environment having a VCC application server node disposed in the IMS network, the message being generated pursuant to a call originated by the UE while roaming in the visited network, wherein the message includes a VCC operational mode indicator indicative of the VCC operational mode that is selectable by a user of the UE device.

In another aspect, disclosed herein is a UE device operable in a network environment including a visited network and a home IMS network, comprising: means, either software, hardware, or any combination thereof, for selecting a VCC operational mode associated with the UE device; and means, either software, hardware, or any combination thereof, for generating a message towards the network environment having a VCC application server node disposed in the IMS network, the message including a VCC operational mode indicator indicative of the VCC operational mode that is selectable by a user of the UE device.

In yet another aspect, disclosed herein is an embodiment of an IMS network node such as a VCC application server node operable with respect to a UE device, comprising: means, either software, hardware, or any combination thereof, for determining whether a call originated by the UE device is to be anchored in the IMS network based on a message propagated responsive to the call origination from the UE device, the message including a VCC operational mode indicator indicative of a VCC operational mode associated with the UE device; and means, either software, hardware, or any combination thereof, for generating a routing message to the visited network based on a determination that the VCC operational mode indicator is indicative of a de-selected status with respect to the UE device's VCC operational mode.

Figure 1:
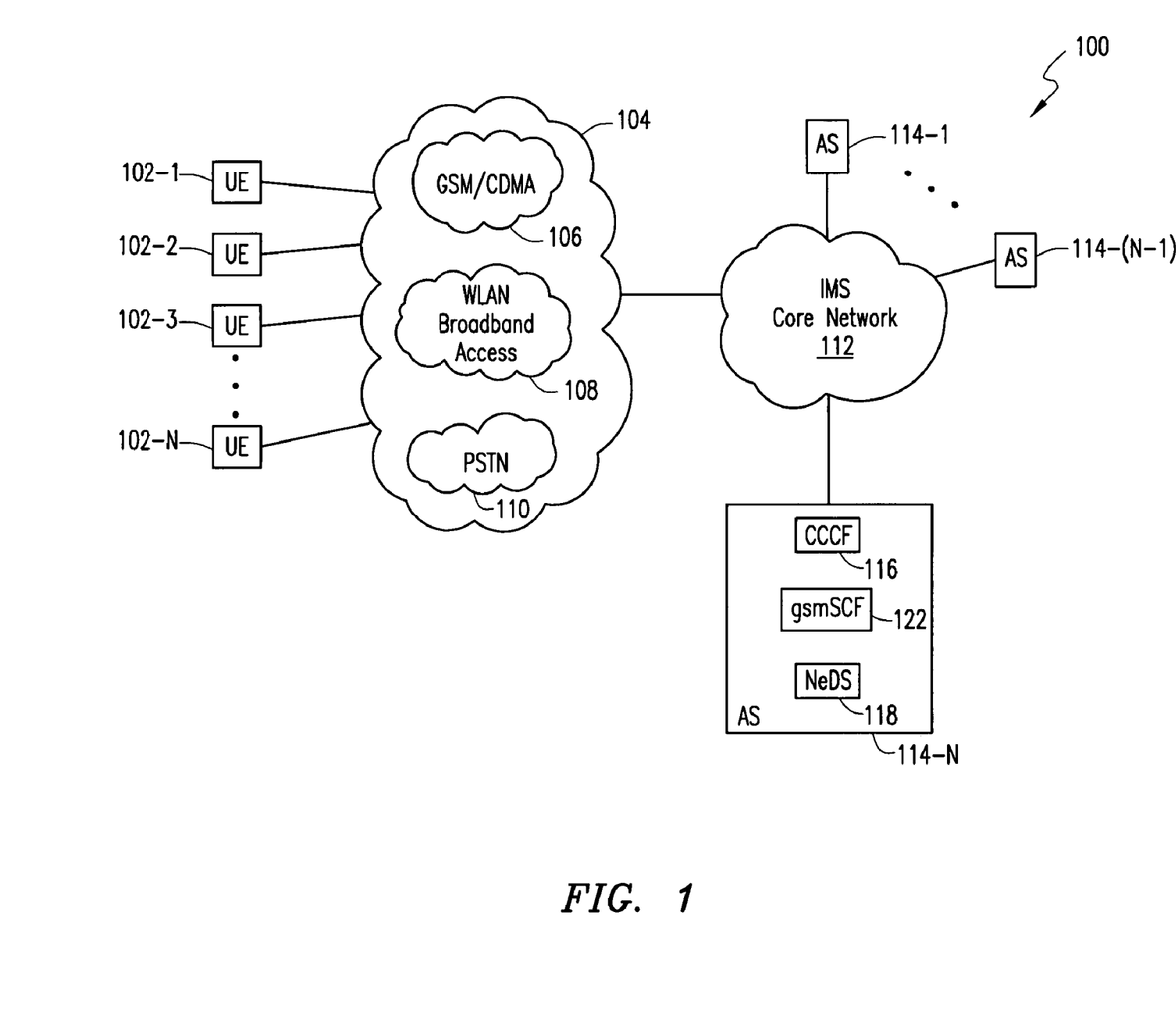
FIG. 1 depicts a generalized network environment including circuit-switched network infrastructure as well as IMS infrastructure wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced. As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity. Accordingly, it is envisaged that the overall functionality (software/hardware/firmware relating to data and control planes) of an exemplary UE device of the present patent disclosure may be logically segregated into CS domain and PS domain functionalities, each being operable with respect to the corresponding technologies.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Further, the cellular networks may be home networks or visited networks with respect to the UE devices being serviced. Reference numeral 108 refers to broadband access networks including wireless local area networks or WLANs, Wi-MAX networks as well as fixed networks such as DSL, cable broadband, etc. Also exemplified as part of the access space 104 is the conventional wireline PSTN infrastructure 110.

An IMS core network 112 is coupled to the various access networks set forth above, including any CS-based networks, e.g., a home network with respect to a particular subscriber and/or UE device. As is well known, the IMS standard defined by the 3GPP is designed to allow service providers manage a variety of services that can be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" to be the network element that delivers services subscribers use, e.g., voice call continuity (VCC), Push-To-Talk (PTT), etc. IMS manages applications by defining common control components that each application server (AS) is required to have, e.g., subscriber profiles, IMS mobility, network access, authentication, service authorization, charging and billing, inter-operator functions, and inter-operation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable.

Continuing to refer to FIG. 1, reference numerals 114-1 to 114-N refer to a plurality of AS nodes operable to support various services, e.g., VCC, PTT, etc., as alluded to hereinabove. Furthermore, in order to effectuate call continuity and appropriate domain selection, functionality referred to as call continuity control function (CCCF) and/or network domain selection (NeDS) may be provided as one or more separate nodes disposed in the subscribers' home IMS network 112. Alternatively, these functionalities may be provided as part of an application server node operable to effectuate a particular service. By way of illustration, an IMS network node such as a VCC application server node 114-N may include the CCCF functionality 116 and/or NeDS functionality 118. In essence, the CCCF portion 116 of VCC AS node 114-N is operable as a new IMS application server element that resides in the home IMS network and tracks all call sessions and related mobile VoIP bearer traffic, including call handover/routing between CS and IMS domains. The NeDS portion 118 of the VCC AS node is responsible for performing, inter alia, registration/de-registration management between the IMS and CS networks (e.g., GSM or CDMA). Although potentially separate functions, it is possible to integrate both the CCCF and NeDS functionalities into a single IMS-compatible network node 114-N as illustrated in FIG. 1.

In addition, a suitable session control function (SCF) 122 may be provided as part of the VCC application server node 114-N with respect to applicable radio access technology, e.g., gsmSCF. As will be described in greater detail below, the various functionalities of VCC AS node 114-N are operable to service signaling messages originated by a UE device with respect to call connection management, among others. In particular, it will be seen that the control logic associated with VCC AS node 114-N is operable to effectuate generation of appropriate routing messages when a call is originated by a UE device that is roaming in a visited network.

Figure 2:
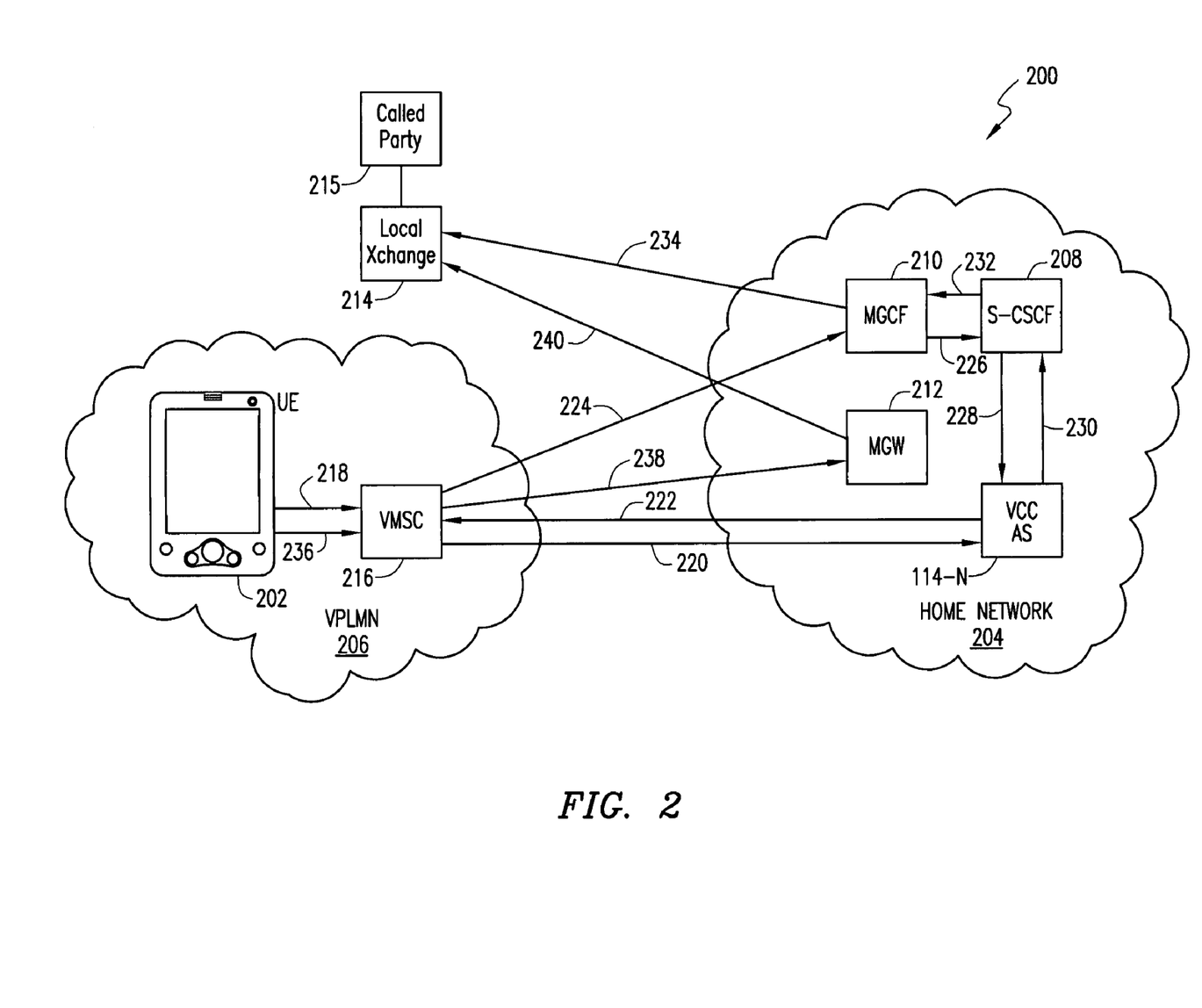
FIG. 2 depicts an exemplary network scenario for illustrating a conventional call setup flow with respect to a call originated by a VCC-capable UE device while roaming in a visited network.

FIG. 2 depicts an exemplary network scenario 200, which may be a subset of the network environment 100 described above, for illustrating a conventional call setup flow with respect to a call originated by a generalized UE device 202 while roaming in a visited network, i.e., a Visited Public Land Mobile Network or VPLMN 206. By way of further generalization, a home network 204 associated with the UE device 202 is exemplified with applicable IMS network elements, VCC application server node 114-N and a serving call/session control function or S-CSCF 208, as well as media gateway (MG)-related entities such as media gateway control function or MGCF 210 and media gateway or MGW 212.

With respect to call origination by the UE device 202, a setup signaling message is provided via suitable signaling path 218 to a visited Mobile Switching Center (VMSC) node 216 of VPLMN 206, which then interfaces with VCC AS node 114-N via signaling path 220 (using, e.g., a Customized Applications for Mobile Enhanced Logic (CAMEL) Application Part (CAP) message). Conventionally, this mobile-originated call is anchored within the home IMS network and, accordingly, a reply message with appropriate address routing information is propagated via signaling path 222 (e.g., using a CAP-Connect message). Responsive to the received address routing information, VMSC 216 interfaces with MGCF 210 via signaling path 224 (using, e.g., an Initial Address Message or IAM). In response, MGCF 210 engages in appropriate SIP signaling with VCC AS node 114-N via S-CSCF 208 by way of signaling paths 226 and 228. Thereafter, suitable reply messaging is provided by the control logic of VCC AS node 114-N by way of signaling paths 230 and 232 via S-CSCF 208, responsive to which MGCF 210 signals to a local exchange 214 associated with VPLMN via signaling path 234, wherein exchange 214 is operable to serve a called party 215 with respect to the call originated by UE 202. A bearer path comprising segments 236, 238 and 240 is then established between UE device 202 and the called party 215 via VMSC 216 and MGW 212 for effectuating a communication session therebetween.

As alluded to in the Background section of the present patent application, IMS anchoring of such mobile-originated calls while roaming as described in the foregoing can be wasteful of radio signaling resources, particularly where the roaming subscriber cannot obtain or is not interested in obtaining VCC services for any number of reasons. As pointed out earlier, for example, the visited network may not support interoperability with appropriate IP-based access networks (e.g., a WLAN) that facilitate the VCC service and, accordingly, an indication may be provided to the UE device that the VCC service is unavailable in the visited area. Alternatively or additionally, even if the VCC service is available in the visited area, the quality of service may not be satisfactory for some reason.

Figure 3:
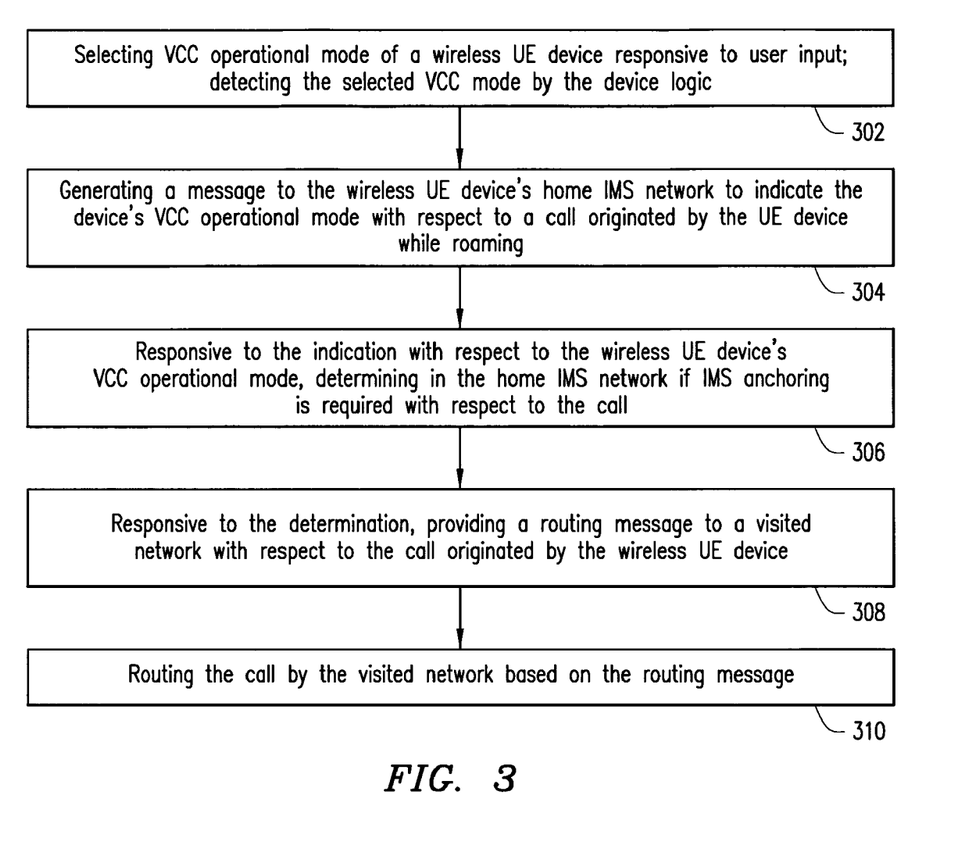
FIG. 3 depicts a flowchart of an exemplary embodiment of the present patent disclosure.

FIG. 3 depicts a flowchart of an exemplary embodiment of the present disclosure for controlling the VCC functionality of a wireless UE device while roaming in a visited area. In accordance with the teachings of the present patent disclosure, the exemplary UE device is provided to be capable of operating in a "VCC ON" mode (i.e., VCC service is selected) or in a "VCC OFF" mode (i.e., VCC service is de-selected). Further, the UE is provided with suitable means, e.g., software, hardware, or any combination thereof, for selecting or selectably changing the device's VCC operational mode responsive to user input. In one embodiment, the VCC operational mode may be selected or selectably changed on a per-call basis. Upon appropriately setting the VCC operational mode of the device and responsive to its detection (block 302), a message is generated by the UE device towards a VCC application server node disposed in the home IMS network associated therewith in order to indicate the device's VCC operational mode status, wherein the message is generated pursuant to a call origination by the wireless UE device while roaming in a visited network (block 304). As will be shown below, this message path flow may be effectuated via one or more intermediary nodes, e.g., a VMSC. Responsive to the indication with respect to the UE device's VCC operational mode, a determination is made in the home IMS network, i.e., the control logic of the VCC application server node, if IMS anchoring is required for the call originated by the UE device (block 306). Responsive to the determination, a suitable routing message is provided to the VMSC, whereupon the service logic of the VMSC is operable to route the call accordingly (block 310). If the VCC operational mode is indicated to be in a de-selected state (i.e., VCC OFF mode), then no IMS anchoring is required and, therefore, additional signaling in the network environment is avoided.

Figure 4:
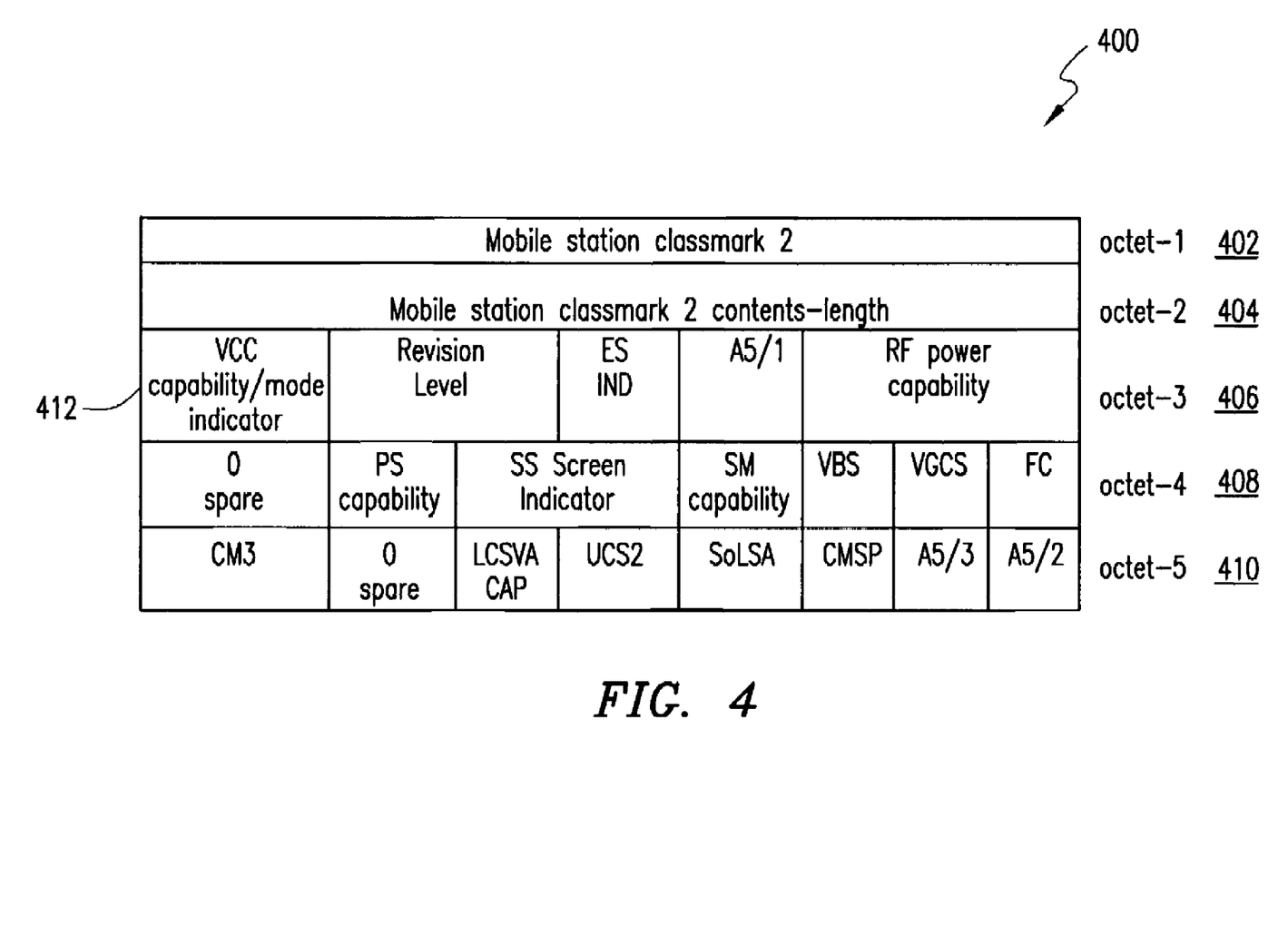
FIG. 4 depicts an exemplary information element transmitted by a UE device for indicating to its home IMS network with respect to the device's VCC operational mode.

In an exemplary embodiment, a VCC operational mode indicator is provided as a bit field or flag in a suitable information element (e.g., Classmark 2 information element (IE) in accordance with 3GPP TS 24.008) that is generated with respect to call origination. As is known in the art, mobile station Classmark 2 IE may be provided in a connection management (CM) service request message as part of the initial signaling message flow for call origination. Referring now to FIG. 4, depicted therein is an exemplary Classmark 2 IE 400 transmitted by a UE device for indicating to its home IMS network with respect to the device's VCC capability or its operational mode status. As illustrated, IE 400 comprises a plurality of octets, i.e., octet-1 402 through octet-5 410, each including one or more bit fields for defining various device capabilities such as revision level, RF power capability, encryption algorithms used, and the like. Additionally, certain spare fields are also provided in one or more octets of IE 400. A spare binary bit location of octet-3 406, bit-8 location in particular, is provided as a VCC capability/mode indicator 412 for purposes of the present disclosure. When bit-8 is set to a binary 1, it is operable to indicate that the UE device's VCC operational mode is selected to be a VCC ON mode (i.e., the device is VCC capable and/or VCC service capability is desired). Conversely, bit-8 may be set to a binary 0 to indicate that the VCC operational mode is selected to be a VCC OFF mode (i.e., the device is not VCC capable and/or VCC service capability is not desired.

Figure 5:
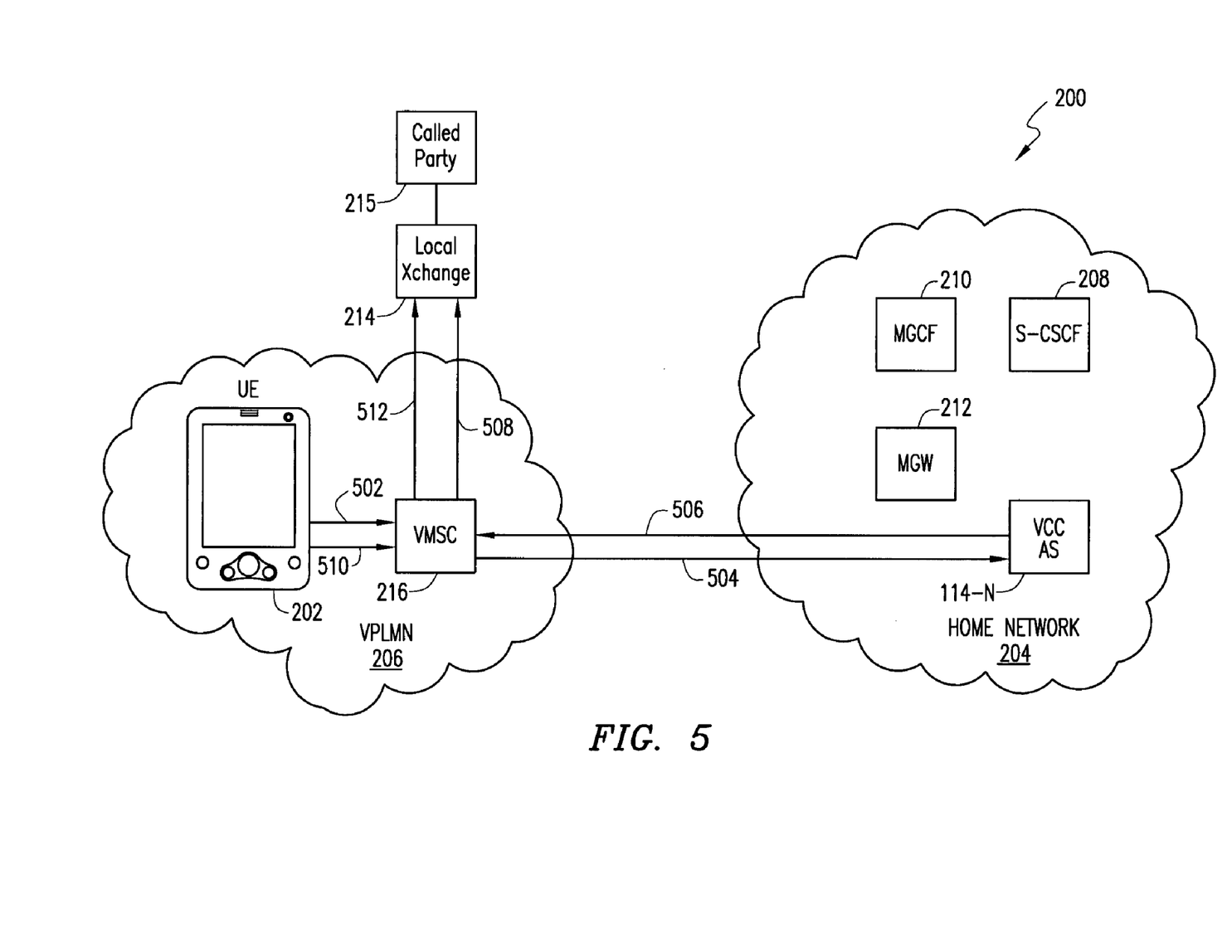
FIG. 5 depicts the exemplary network scenario of FIG. 2 for illustrating a modified call setup flow with respect to a call originated by a UE device that is operable to control its VCC operational mode in accordance with an embodiment.

FIG. 5 depicts the exemplary network scenario 200 of FIG. 2 for illustrating a modified call setup flow with respect to a call originated by UE device 202 upon modifying its VCC operational mode to a VCC OFF mode (i.e., bit-8 in the IE's third octet is set to 0). As before, home network 204 including VCC AS node 114-N is operable to serve UE device 202 that is roaming in VPLMN 206. A setup message including a VCC operational mode indicator is provided via signaling path 502 to VMSC 216, which then interfaces with VCC AS node 114-N via signaling path 504 (using, e.g., a CAP-compatible initial detection point (IDP) trigger message). Upon examining the VCC operational mode indicator in the received message's IE, the control logic of VCC AS node 114-N determines that the call does not require to be anchored within the home IMS network and, accordingly, a reply message with appropriate address routing information is propagated via signaling path 506 (e.g., using a CAP-Connect message). Responsive to the received address routing information, VMSC 216 interfaces with local exchange 214 via signaling path 508, whereby the additional IMS and MG entities, S-CSCF 208, MGCF 210, and MGW 212, are avoided. A bearer path comprising segments 510 and 512 is then established between UE device 202 and the called party 215 via VMSC 216.

Figure 6:
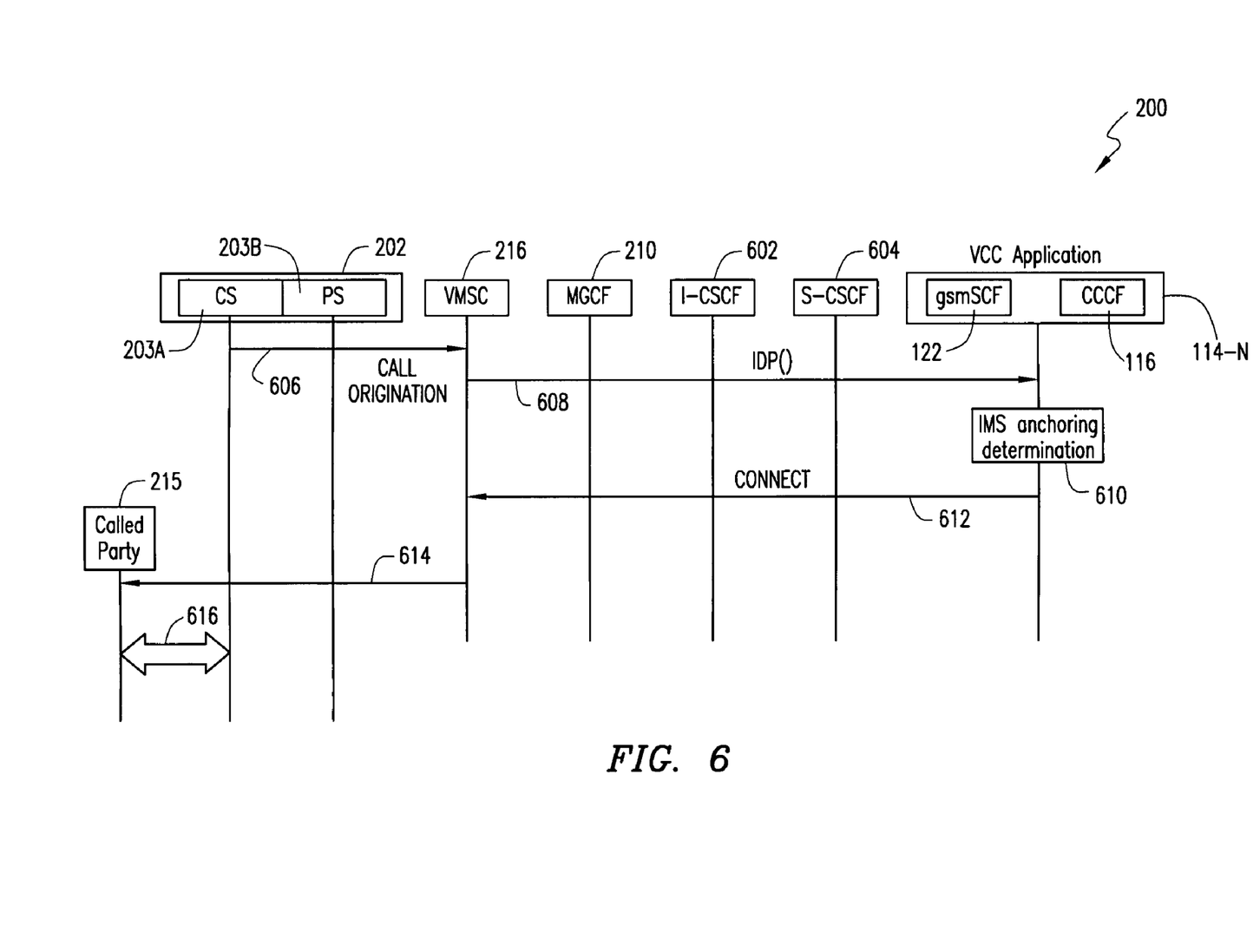
FIG. 6 depicts a message flow of an exemplary embodiment of the present patent disclosure.

FIG. 6 depicts a message flow diagram of an exemplary call setup embodiment of the present patent disclosure. UE device 202 comprising CS domain 203A and PS domain 203B is operable to generate call origination 606 using its CS domain 203A towards VMSC 216 while roaming in the associated visited area. For purposes of the present disclosure, call origination 606 is deemed to include various aspects of initial signaling, e.g., setup messaging, service request messaging, and the like, and comprises call information such as called party number (i.e., B-number) and VCC operational mode indicator as discussed above. Responsive thereto, VMSC 216 generates a CAMEL Initial Detection Point (IDP) message 608 including the VCC operational mode indicator towards VCC AS node 114-N. Suitable IMS anchoring determination logic 610 associated with gsmSCF 122 of VCC AS node 114-N is operable to determine if the call requires IMS anchoring based on the VCC operational mode indicator. If the call is to be anchored in IMC (because, e.g., VCC ON mode is indicated), then the call is directed to CCCF 116 for subsequent signaling as described previously. Otherwise, a CAP-Connect message 612 is provided to VMSC 216, whereupon appropriate signaling 614 is provided to the called party 215 via local exchange (not shown), avoiding additional entities MGCF 210, I-CSCF 602, and S-CSCF-604. Thereafter, a bearer path 616 is established between UE device 202 and the called party 215 for facilitating communication therebetween.

Figure 7:
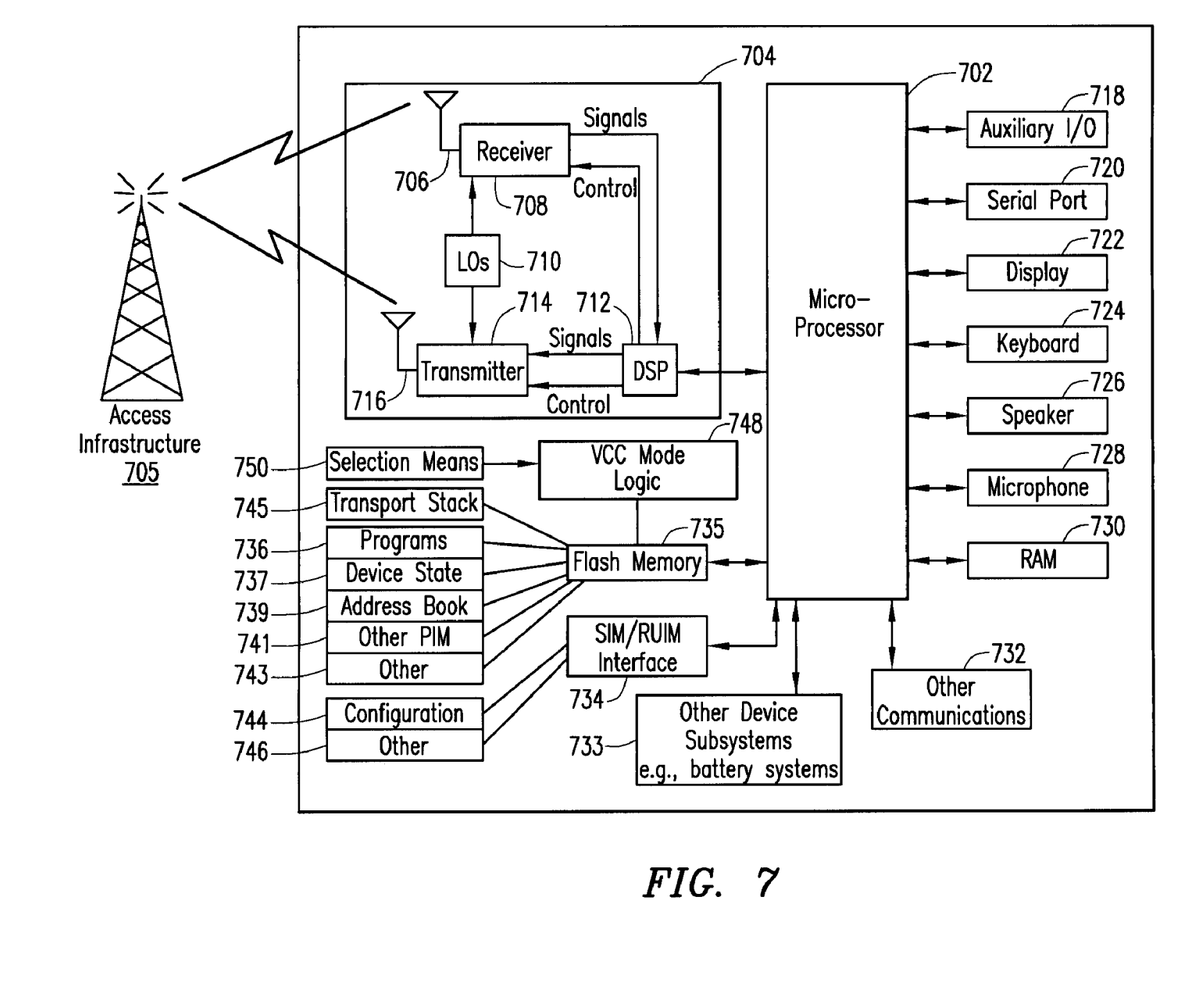
FIG. 7 depicts a block diagram of an embodiment of a communications device operable for purposes of the present patent disclosure.

FIG. 7 depicts a block diagram of an embodiment of a communications device operable as a wireless UE device, e.g., UE 202, for purposes of the present patent disclosure. It will be recognized by those skilled in the art upon reference hereto that although an embodiment of UE 202 may comprise an arrangement similar to one shown in FIG. 7, there can be a number of variations and modifications, in hardware, software or firmware, with respect to the various modules depicted. Accordingly, the arrangement of FIG. 7 should be taken as illustrative rather than limiting with respect to the embodiments of the present patent disclosure. A microprocessor 702 providing for the overall control of an embodiment of UE 202 is operably coupled to a communication subsystem 704 that is capable of multi-mode communications (e.g., CS domain, IP domain such as IMS, et cetera). The communication subsystem 704 generally includes one or more receivers 708 and one or more transmitters 714 as well as associated components such as one or more local oscillator (LO) modules 710 and a processing module such as a digital signal processor (DSP) 712. As will be apparent to those skilled in the field of communications, the particular design of the communication module 704 may be dependent upon the communications networks with which the mobile device is intended to operate (e.g., a CDMA network, a GSM network, WLAN, et cetera). Regardless of the particular design, however, signals received by antenna 706 through appropriate access infrastructure 705 (e.g., cellular base station towers, WLAN hot spots, etc.) are provided to receiver 708, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 712, and provided to transmitter 714 for digital-to-analog (D/A) conversion, frequency up conversion, filtering, amplification and transmission over the air-radio interface via antenna 716.

Microprocessor 702 may also interface with further device subsystems such as auxiliary input/output (I/O) 718, serial port 720, display 722, keyboard/keypad 724, speaker 726, microphone 728, random access memory (RAM) 730, a short-range communications subsystem 732, and any other device subsystems, e.g., timer mechanisms, battery systems, etc. generally labeled as reference numeral 733. To control access, a Subscriber Identity Module (SIM) or Removable User Identity Module (RUIM) interface 734 may also be provided in communication with the microprocessor 702. In one implementation, SIM/RUIM interface 734 is operable with a SIM/RUIM card having a number of key configurations 744 and other information 746 such as identification and subscriber-related data.

Operating system software and applicable service logic software may be embodied in a persistent storage module (i.e., non-volatile storage) such as Flash memory 735. In one implementation, Flash memory 735 may be segregated into different areas, e.g., storage area for computer programs 736 (e.g., service processing logic), as well as data storage regions such as device state 737, address book 739, other personal information manager (PIM) data 741, and other data storage areas generally labeled as reference numeral 743. A transport stack 745 may be provided to effectuate one or more appropriate radio-packet transport protocols. In addition, a VCC operational mode logic module 748 is provided for effectuating appropriate VCC mode responsive to user input/selection, e.g., user actions via means 750 operable in association with such entities as keypad input, toggle switching, or other user interface. Accordingly, the UE device includes means, software, hardware, or any combination thereof, for selecting a VCC operational mode associated with the UE device; and means for generating a message towards a VCC application server node disposed in the IMS network of the UE device. As described above, the message includes a VCC operational mode indicator indicative of the device's VCC operational mode that is selectable by the user.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method of controlling voice call continuity (VCC) functionality of a user equipment (UE) device with respect to a call in a network environment including a visited network and an Internet Protocol (IP) multimedia subsystem (IMS) network, said method comprising:
   detecting a VCC operational mode associated with said UE device; and
   generating a message by said UE device towards said network environment having a VCC application server node disposed in said IMS network, said message being generated pursuant to a call originated by said UE device while roaming in said visited network, wherein said message includes a VCC operational mode indicator indicative of said VCC operational mode that is selectable by a user of said UE device, further wherein said VCC operational mode indicator comprises one or more bits in an information element that is included in said message.

2. The method of controlling VCC functionality of a UE device as recited in claim 1, wherein said VCC operational mode is selected on a per-call basis.

3. The method of controlling VCC functionality of a UE device as recited in claim 1, wherein said information element comprises a plurality of octets and said VCC operational mode indicator comprises a bit-8 location in a third octet of said information element.

4. The method of controlling VCC functionality of a UE device as recited in claim 3, wherein said bit-8 location is set to a binary 1 to indicate that said VCC operational mode is selected to be a VCC ON mode.

5. The method of controlling VCC functionality of a UB device as recited in claim 3, wherein said bit-8 location is set to a binary 0 to indicate that said VCC operational mode is selected to be a VCC OFF mode.

6. The method of controlling VCC functionality of a UE device as recited in claim 1, wherein said message comprises a connection management (CM) service request message as part of call origination by UF device.

7. The method of controlling VCC functionality of a UE device as recited in claim 1, wherein said VCC operational mode indicator is carried in a Classmark 2 information element.

8. The method of controlling VCC functionality of a UE device as recited in claim 7, wherein said VCC operational mode indicator is encoded in a bit-8 location of a third octet of said Classmark 2 information element.

9. The method of controlling VCC functionality of a UE device as recited in claim 1, wherein said VCC operational mode is changed responsive to one or more actions by said user.

10. The method of controlling VCC functionality of a UF device as recited in claim 9, wherein said user changes said VCC operational mode based on an indication that no satisfactory VCC service is available with respect to said visited network.

11. A wireless user equipment (UE) device operable to originate a call in a network environment including a visited network and an Internet Protocol (IP) multimedia subsystem (TMS) network, said wireless UE device comprising:
    means for selecting a VCC operational mode associated with said UE device; and
    means for generating a message towards said network environment having a VCC application server node disposed in said IMS network, said message including a VCC operational mode indicator indicative of said VCC operational mode that is selectable by a user of said UE device, wherein said VCC operational mode indicator comprises one or more bits in an information element that is included in said message.

12. The wireless UE device as recited in claim 11, wherein said VCC operational mode is selectable on a per-call basis.

13. The wireless UE device as recited in claim 11, wherein said information element comprises a plurality of octets and said VCC operational mode indicator comprises a bit-8 location in a third octet of said information element.

14. The wireless UE device as recited in claim 13, wherein said bit-8 location is set to a binary 1 to indicate that said VCC operational mode is selected to be a VCC ON mode.

15. The wireless UE device as recited in claim 13, wherein said bit-8 location is set to a binary 0 to indicate that said VCC operational mode is selected to be a VCC OFF mode.

16. The wireless UE device as recited in claim 11, wherein said message comprises a connection management (CM) service request message as part of call origination by said UE device while roaming in said visited network.

17. The wireless UB device as recited in claim 11, wherein said VCC operational mode indicator is carried in a Classmark 2 information element.

18. The wireless UE device as recited in claim 17, wherein said VCC operational mode indicator is encoded in a bit-8 location of a third octet of said Classmark 2 information element.

19. A voice call continuity (VCC) application server node operable in a network environment including a visited network and an Internet Protocol (IP) multimedia subsystem (IMS) network, said VCC application server node comprising:
    means for determining whether a call originated with respect to a user equipment (UE) device is to be anchored in said IMS network based on a message propagated responsive to said call from said UE device, said message including a VCC operational mode indicator indicative of a VCC operational mode associated with said UE device; and
    means for generating a routing message to said visited network based on a determination that said VCC operational mode indicator is indicative of a de-selected status with respect to said UE device's VCC operational mode, wherein said VCC operational mode indicator comprises one or more bits in an information element that is included in said message.

20. The VCC application server node as recited in claim 19, wherein said information element comprises a plurality of octets and said VCC operational mode indicator comprises a bit-8 location in a third octet of said information element.

21. The VCC application server node as recited in claim 20, wherein said bit-8 location is set to a binary 0 to indicate that said VCC operational mode is in said deselected status.

22. The VCC application server node as recited in claim 19, wherein said message comprises a Customized Applications for Mobile Enhanced Logic (CAMEL) Initial Detection Point (IDP) message.

23. The VCC application server node as recited in claim 19, wherein said VCC operational mode indicator is carried in a Classmark 2 information element of said message.

24. The VCC application server node as recited in claim 23, wherein said VCC operational mode indicator is encoded in a bit-8 location of a third octet of said Classmark 2 information element.

* * * * *